Aug. 5, 1930.  E. REICHELDERFER  1,772,226

SAFETY ATTACHMENT FOR CAR BRAKES

Filed March 21, 1930   2 Sheets-Sheet 1

Inventor
E. Reichelderfer

By Clarence A. O'Brien
Attorney

Aug. 5, 1930.  E. REICHELDERFER  1,772,226
SAFETY ATTACHMENT FOR CAR BRAKES
Filed March 21, 1930   2 Sheets-Sheet 2
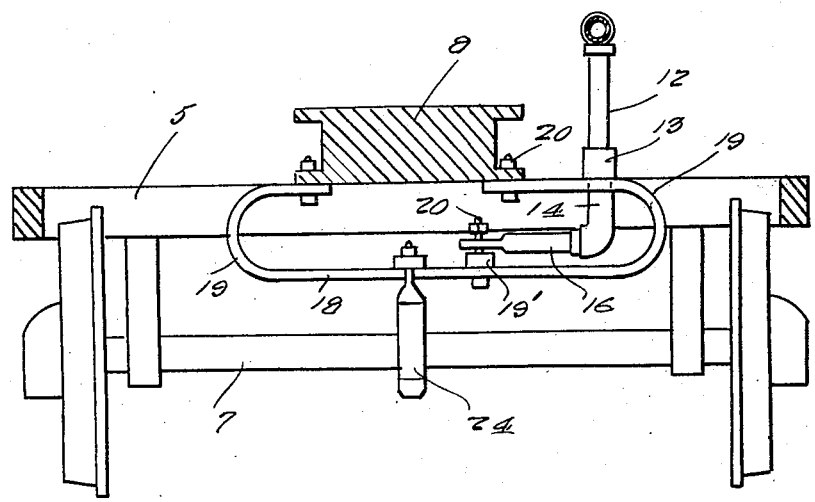
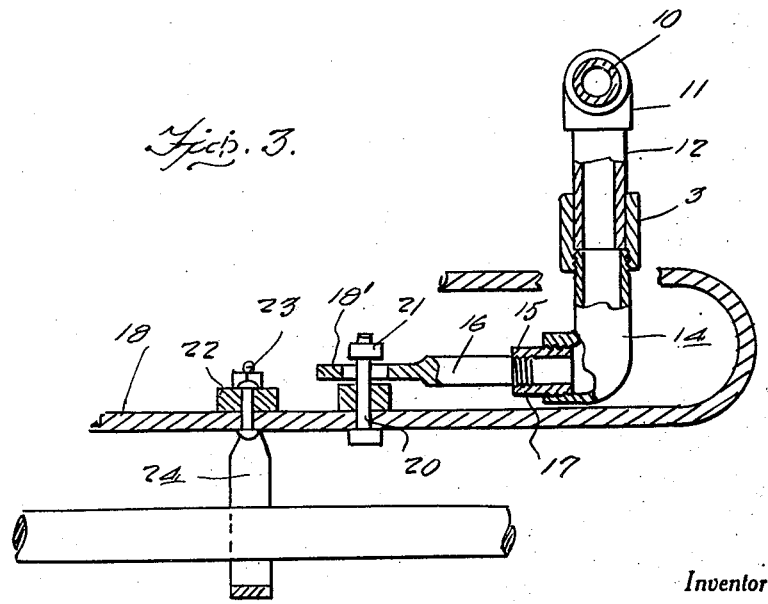
Inventor
E. Reichelderfer
By Clarence A. O'Brien
Attorney Patented Aug. 5, 1930

1,772,226

UNITED STATES PATENT OFFICE

EARL REICHELDERFER, OF CATAWISSA, PENNSYLVANIA

SAFETY ATTACHMENT FOR CAR BRAKES

Application filed March 21, 1930. Serial No. 437,744.

This invention relates to certain new and useful improvements in attachments for railway cars to cause the brakes to be applied immediately in the event the wheels of a train leave the rail, or in the event one of the trucks of a train becomes broken which in many instances may result in a derailment of the truck.

It is, therefore, the primary object of this invention to provide an attachment certain parts of which are carried by the car frame and have operative connection with other parts arranged adjacent the axle of the truck together with means whereby the attachment becomes a part of the air line forming a part of the braking mechanism of the train line, and in such a manner that in the event the wheels of a truck leave the track or the truck frame becomes broken the brakes will be immediately applied.

A still further and very important object of the invention is to provide an attachment of this character which will require no material alterations either in the structure of the truck frame or the train pipe line, and further wherein the attachment comprises comparatively few parts, is simple in construction and operation, practical and thoroughly reliable and otherwise well adapted for the purpose desired.

Other objects and advantages of the invention will become apparent during a study of the following description, taken in connection with the accompanying drawings, wherein:—

Figure 1 is a fragmentary side elevational view of a standard truck having my invention applied thereto.

Figure 2 is an end elevational view partly in section of the truck for more clearly illustrating the application of the invention.

Figure 3 is a fragmentary detail view partly in section and partly in elevation, and with certain parts broken away, for clearly illustrating certain details of construction to be hereinafter more specifically referred to.

Figure 4 is a fragmentary detail view showing the coupling to the train pipe line in elevation together with the stirrup forming part of the invention for disposition about the axles of the truck, certain other parts of the invention being shown in section for clearly illustrating the manner in which the stirrup is operatively associated with the coupling to the train pipe line.

With reference more in detail to the drawings, it will be seen that I have designated a standard type of truck generally by the reference character 5. The wheels of the truck are designated by the reference character 6 and the axle by the reference character 7. The center sill of the car is designated generally by the reference character 8.

The train line pipe is designated generally by the reference character 10 and as shown, this pipe 10 has arranged therein a sleeve coupling 11 from which depends a vertically disposed nipple 12, the lowermost end of the nipple having a sleeve coupling 13 associated therewith. An elbow 14 has its upper end threaded in the lower end of the coupling sleeve 13 as shown to advantage in Figure 3, while threaded within the other end of the elbow 14 is a reducer 15. Obviously, the members 12, 13, 14 and 15 provide a conduit for the air passing through the pipe line 10, and for closing the conduit, a tubular rod 16 has one threaded end threaded within the reducer 15 as at 17, the other end portion of the rod 16 is flat, said flattened end being provided with an opening 18'.

A spring member has an intermediate portion 18 thereof disposed above and in spaced parallelism to one of the axles 7, and this spring 18 has its ends bent inwardly as at 19, and said ends are bolted as at 20 to the center sill 8 as clearly shown to advantage in Figure 2. One bent end 19 of the member 18 is disposed adjacent the elbow 14 and adjacent said one end there is suitably secured to the intermediate portion 18 of the spring member a stop block 19', through which stop block 19', the aperture 18, and adjacent portion of the spring extends vertically a headed pin 20, on the upper end of which is suitably threaded a stop nut 21 between which nut 21 and the stop block 19 is normally disposed the flattened end of the rod 16, said flattened end being normally disposed in spaced relation to the block 19' and nut 21 as clearly suggested in Figures 2 and 3. Between the other end of the spring member and the stop block 19' there is suitably bolted to the intermediate portion 18 of said spring a transversely disposed attaching plate 22 to the ends of which are suitably secured as at 23 the upper end of a substantially U-shaped stirrup 24 which stirrup 24 straddles the said one axle 7. Normally, the crown or connecting web portion of the U-shaped stirrup 24 is disposed in spaced relation to said axle 7 as clearly suggested in Figures 3 and 4.

From the foregoing then it is apparent that in the event of the derailment of the truck the axle 7 will contact with the bight or connecting web of the stirrup 24 thus exerting sufficient downward pull on the stirrup for bending or flexing downwardly the intermediate portion 18 of the spring, resulting in a downward pull of the pin 20 so that the nut 21 will contact with the flattened end of the rod 16, which rod 16 being rigid with the elbow 14 will, of course, when sufficient pressure is exerted upon the rod, cause the elbow 14 to break at a point adjacent the sleeve coupling 13 thus permitting free exhaust of the air from the pipe line 10 resulting in an emergency application of the brakes.

On the other hand, in the event of a broken truck it is apparent that the intermediate portion 18 of the spring will drop downwardly with the truck upon the axle 7 thus causing an upward push on the pin 20 so that the stop block 19' will push upwardly against the flattened end of the rod 16 the result of course being, as is apparent, the breaking off of the elbow 14 at the sleeve coupling 13 thus permitting of an emergency application of the brake.

From the foregoing then it will be appreciated that through the instrumentality of this invention, a train will be stopped almost immediately as soon as a pair of wheels of one truck become derailed thus avoiding damage to the truck and equipment. Of course, as is well known, in event of derailment the truck will have the tendency to continue along the ties until finally the truck breaks down as is caused when the truck comes into contact with frogs or guard rails often resulting in obstructing the other line of railway tracks.

With the present invention, such continued movement of the derailed truck is eliminated since the train will come to immediate stop upon derailment.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:—

1. In an emergency brake applying attachment for a railway car, in combination, the center sill and the axle of the car truck, a train pipe having an escape branch, a spring member secured at its end to said sill and having an intermediate portion disposed parallel to said axle, a rod having one end threaded within said branch for closing the latter, said rod having its free end thereof normally disposed in spaced relation to the intermediate portion of said spring member, and adapted for engagement therewith upon abnormal flexing of the intermediate portion of said spring member for exerting strain upon said rod to cause a breaking off of the branch at points in the length of the branch.

2. In a device of the class described, and in combination with a truck frame including a center sill and an axle, of a train pipe provided with an escape branch, a bar rigidly secured at one end in the free end of the branch for closing the same, a spring member having a relatively flat intermediate portion disposed in parallelism and above said axle, said spring member at the end thereof adapted to be secured to said center sill, a pin extending from the intermediate portion of said spring member, through an opening provided therefor in the other end of said bar, a nut threaded on the upper end of said pin, and the last referred to end of said bar adapted to be normally disposed between said nut and the adjacent portion of said spring member.

3. In a device of the class described, and in combination with a truck frame including a center sill and an axle, of a train pipe provided with an escape branch, a bar rigidly secured at one end in the free end of the branch for closing the same, a spring member having a relatively flat intermediate portion disposed in parallelism and above said axle, said spring member at the end thereof adapted to be secured to said center sill, a pin extending from the intermediate portion of said spring member, through an opening provided therefor in the other end of said bar, a nut threaded on the upper end of said pin, and the last referred to end of said bar adapted to be normally disposed between said nut and the adjacent portion of said spring member, and a member rigidly secured to the intermediate portion of said spring member and disposed in position with respect to said axle for direct engagement thereby upon derailment.

4. In a device of the class described, and in combination with a truck frame including a center sill and an axle, of a train pipe provided with an escape branch, a bar rigidly secured at one end in the free end of the branch for closing the same, a spring member having a relatively flat intermediate portion disposed in parallelism and above said axle, said spring member at the end thereof adapted to be secured to said center sill, a pin extending from the intermediate portion of said spring member, through an opening provided therefor in the other end of said bar, a nut threaded on the upper end of said pin, and the last referred to end of said bar adapted to be normally disposed between said nut and the adjacent portion of said spring member, and a member rigidly secured to the intermediate portion of said spring member and disposed in position with respect to said axle for direct engagement thereby upon derailment, said last mentioned member being substantially U-shaped and having the crown portion thereof disposed transversely of and below said axle.

5. In an emergency brake applying attachment for a railway car, the combination with a train pipe, a member closing the train pipe, a member rigidly secured to the truck frame of the railway car and having an intermediate portion disposed in spaced parallelism to the axle of the truck frame, said intermediate portion of the second referred to member adapted to engage said train pipe closing member upon an abnormal flexing of the intermediate portion of said second member, for operating said train pipe closing member.

6. In a brake applying device for railway cars operable upon derailment or breakage of the car truck comprising, in combination with the train pipe line, a member normally closing the train pipe line, a flexible member carried by the car truck and disposed parallel to the axle of the truck, said flexible member having loose connection with the first mentioned member, and a third member depending from said flexible member and disposed about said axle normally out of contact with the axle.

In testimony whereof I affix my signature.

EARL REICHELDERFER.